US007093359B2

(12) United States Patent
Morrison et al.

(10) Patent No.: US 7,093,359 B2
(45) Date of Patent: Aug. 22, 2006

(54) COMPOSITE STRUCTURE FORMED BY CMC-ON-INSULATION PROCESS

(75) Inventors: Jay A. Morrison, Oviedo, FL (US); Gary Brian Merrill, Orlando, FL (US); Jay Edgar Lane, Murrysville, PA (US); Steven C. Butner, Poway, CA (US); Harry A. Albrecht, Hobe Sound, FL (US); Scott M. Widrig, Hobe Sound, FL (US); Yevgeniy P. Shteyman, West Palm Beach, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 465 days.

(21) Appl. No.: 10/245,528

(22) Filed: Sep. 17, 2002

(65) Prior Publication Data

US 2005/0076504 A1 Apr. 14, 2005

(51) Int. Cl.
*B21K 3/04* (2006.01)
*B21D 53/78* (2006.01)
*B23P 15/02* (2006.01)

(52) U.S. Cl. ............................... 29/889.71; 29/889.72; 29/889.721; 29/889.722; 428/293.4; 264/35; 264/257; 264/259; 264/267

(58) Field of Classification Search ............... 29/889.7, 29/889.71, 889.72, 889.721, 889.722; 428/293.4; 264/35, 332, 125, 241, 257, 258, 259, 267
See application file for complete search history.

(56) References Cited

U.S. PATENT DOCUMENTS 2,477,375 A * 7/1949 Jablonsky .................... 156/222
3,910,716 A 10/1975 Roughgarden et al.
4,396,349 A 8/1983 Hueber
4,519,745 A 5/1985 Rosman et al.
4,530,884 A 7/1985 Erickson et al.
4,563,125 A 1/1986 Boudigues et al.
4,563,128 A 1/1986 Rossmann
4,629,397 A 12/1986 Schweitzer
4,639,189 A 1/1987 Rosman
4,643,636 A 2/1987 Libertini et al.
4,645,421 A 2/1987 Huether (Continued)

OTHER PUBLICATIONS

WO 2002/27145 (Derwent Abstract) Apr. 4, 2002.*

*Primary Examiner*—David P. Bryant
*Assistant Examiner*—Eric Compton

(57) ABSTRACT

A method of manufacturing a composite structure uses a layer of an insulating material (22) as a mold for forming a substrate of a ceramic matrix composite (CMC) material (24). The insulating material may be formed in the shape of a cylinder (10) with the CMC material wound on an outer surface (14) of the cylinder to form a gas turbine combustor liner (20). Alternatively, the insulating material may be formed in the shape of an airfoil section (32) with the CMC material formed on an inside surface (36) of the insulating material. The airfoil section may be formed of a plurality of halves (42, 44) to facilitate the lay-up of the CMC material onto an easily accessible surface, with the halves then joined together to form the complete composite airfoil. In another embodiment, a box structure (102) defining a hot gas flow passage (98) is manufactured by forming insulating material in the shape of opposed airfoil halves (104) joined at respective opposed ends by platform members (109). A layer of CMC material (107) is then formed on an outside surface of the insulating material. A number of such composite material box structures are then joined together to form a vane ring (100) for a gas turbine engine.

15 Claims, 7 Drawing Sheets

U.S. PATENT DOCUMENTS

| | | | | |
|---|---|---|---|---|
| 4,768,924 | A | 9/1988 | Carrier et al. | |
| 4,790,721 | A | 12/1988 | Morris et al. | |
| 4,838,031 | A | 6/1989 | Cramer | |
| 4,907,946 | A | 3/1990 | Ciokajlo et al. | |
| 5,027,604 | A | 7/1991 | Krueger | |
| 5,062,767 | A * | 11/1991 | Worley et al. | 415/209.3 |
| 5,226,789 | A | 7/1993 | Donges | |
| 5,306,554 | A | 4/1994 | Harrison et al. | |
| 5,314,309 | A | 5/1994 | Blakeley et al. | |
| 5,328,331 | A | 7/1994 | Bunker et al. | |
| 5,358,379 | A | 10/1994 | Pepperman et al. | |
| 5,375,978 | A | 12/1994 | Evans et al. | |
| 5,382,453 | A | 1/1995 | Mason | |
| 5,439,627 | A * | 8/1995 | De Jager | 264/129 |
| 5,484,258 | A | 1/1996 | Isburgh et al. | |
| 5,493,855 | A | 2/1996 | Walters et al. | |
| 5,494,402 | A | 2/1996 | Glezer et al. | |
| 5,584,652 | A | 12/1996 | Shaffer et al. | |
| 5,605,046 | A | 2/1997 | Liang | |
| 5,616,001 | A | 4/1997 | Boyd | |
| 5,630,700 | A | 5/1997 | Olsen et al. | |
| 5,640,767 | A | 6/1997 | Jackson et al. | |
| 5,720,597 | A | 2/1998 | Wang et al. | |
| 5,791,879 | A | 8/1998 | Fitzgerald et al. | |
| 5,820,337 | A | 10/1998 | Jackson et al. | |
| 5,881,775 | A * | 3/1999 | Owen et al. | 138/149 |
| 5,887,332 | A * | 3/1999 | Champenois et al. | 29/527.3 |
| 6,000,906 | A | 12/1999 | Draskovich | |
| 6,164,903 | A | 12/2000 | Kouris | |
| 6,197,424 | B1 | 3/2001 | Morrison et al. | |
| 6,200,092 | B1 | 3/2001 | Koschier | |
| 6,241,469 | B1 | 6/2001 | Beeck et al. | |
| 6,325,593 | B1 | 12/2001 | Darkins, Jr. et al. | |
| 6,368,663 | B1 | 4/2002 | Nakamura et al. | |
| 6,384,365 | B1 * | 5/2002 | Seth et al. | 219/76.13 |
| 6,451,416 | B1 * | 9/2002 | Holowczak et al. | 428/293.4 |
| 6,514,046 | B1 * | 2/2003 | Morrison et al. | 416/229 A |
| 2003/0207155 | A1 * | 11/2003 | Morrison et al. | 428/699 |
| 2003/0223861 | A1 * | 12/2003 | Morrison et al. | 415/115 |

* cited by examiner

COMPOSITE STRUCTURE FORMED BY CMC-ON-INSULATION PROCESS

FIELD OF THE INVENTION

This invention relates generally to a method of manufacturing a ceramic matrix composite (CMC) component and, more particularly, to a method of manufacturing a hybrid ceramic component for a gas turbine engine formed of an insulated CMC material.

BACKGROUND OF THE INVENTION

Ceramic matrix composite materials are known for their strength and resistance to temperatures approaching 1,200° C. U.S. Pat. No. 6,197,424 describes the use of high temperature insulation with a ceramic matrix composite to extend the useful operating temperature of the CMC material for hot gas path components of a gas turbine engine. The patent describes a process wherein a casting of the insulating material is formed to its green body state. After removal from the mold, the green body is shaped to conform to the contour of a mating CMC substrate surface. The near net shape green body is fired to its fully stabilized state and then ground to a final shape for bonding to the substrate, such as with a ceramic adhesive. In a most preferred embodiment, the uncured green body is applied to an uncured substrate and the two materials are co-fired to form the final composite structure. It is important to achieve intimate contact between the CMC substrate and the insulating layer in order to maximize the integrity of the structure. Tolerance stack-up between the mating surfaces can complicate this bonding process.

SUMMARY OF THE INVENTION

Accordingly, an improved ceramic composite structure and method of manufacturing the same is desired.

A method of manufacturing a composite structure is described herein as including; forming a layer of thermally insulating material; and using the layer of thermally insulating material as a mold to form a layer of ceramic matrix composite material. The method may include curing the layer of thermally insulating material and the layer of ceramic matrix composite material simultaneously to form a bond there between. The method may further include: forming the layer of thermally insulating material in the shape of a cylinder; and forming the layer of ceramic matrix composite material on an outside surface of the cylinder. The thermally insulating material may be formed in the shape of a cylinder; and the reinforcing fibers of the layer of ceramic matrix composite material may be wound on an outside surface of the cylinder. The method may include: forming the layer of thermally insulating material to have an outside surface defining an airfoil shape and to have an inside surface; and forming the layer of ceramic matrix composite material on the inside surface. The method may include: forming the layer of thermally insulating material to the shape of a box structure comprising a pair of opposed airfoil portions joined at respective ends by an opposed pair of platform members and defining a hot combustion gas passage there between; and forming the layer of ceramic matrix composite material on an outside surface of the box structure.

A method of manufacturing a vane ring for a gas turbine engine is described herein as including: forming a plurality of box structures of thermally insulating material, each box structure comprising a pair of opposed airfoil portions joined at respective ends by an opposed pair of platform members and defining a hot combustion gas passage there between; forming a layer of ceramic matrix composite material on an outside surface of each box structure; and joining the respective box structures together to form a vane ring. The step of joining respective box structures together may further include: joining two metal vane portions together to trap and to support each respective box structure to form a plurality of box structure assemblies; and joining the box structure assemblies together to form the vane ring.

A vane for a gas turbine engine is described herein as including: a top vane portion formed of a thermally insulating material; a bottom vane portion formed of a thermally insulating material and joined to the top vane portion along a leading edge to define an outside surface having an airfoil shape and an inside surface; and a layer of ceramic matrix composite material formed on the inside surface.

A composite structure for use as a hot gas flow path component in a gas turbine engine is described herein as including: a layer of thermally insulating material formed as a box structure comprising a pair of opposed airfoil portions joined at respective ends by an opposed pair of platform members and defining a hot combustion gas passage there between; and a layer of ceramic matrix composite material formed on an outside surface of the box structure.

BRIEF DESCRIPTION OF THE DRAWINGS

These and other advantages of the invention will be more apparent from the following description in view of the drawings that show.

DETAILED DESCRIPTION OF THE INVENTION

Figure 1A:
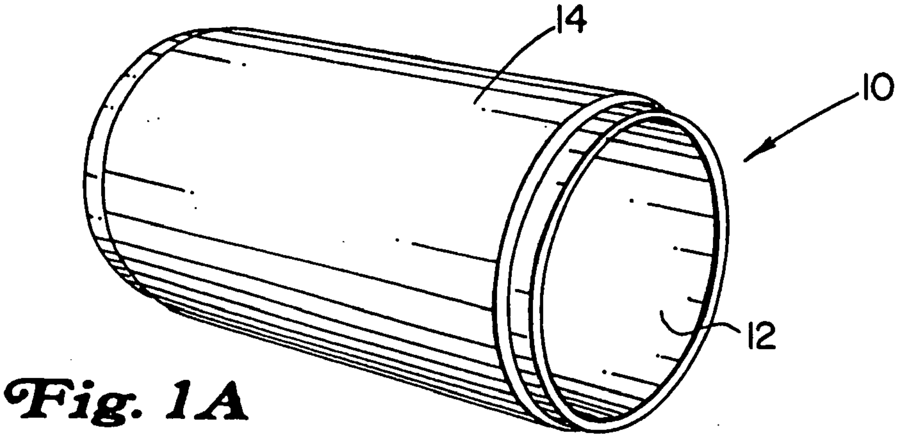
FIGS. 1A–1C illustrate a gas turbine combustion liner during sequential stages of fabrication.

The applicants have found that an improved manufacturing process for ceramic composite structures is achieved by first forming a layer of thermally insulating material and then using the insulating layer as part of a mold for forming the CMC substrate layer. This process is broadly referred to as CMC-on-insulation, although the process is not limited to geometries where the CMC is physically on top of or above the insulating layer. The insulating layer is pre-formed using any known method to have a mating surface upon which the CMC layer is formed and/or shaped using any known method. The insulating layer mating surface may be cast or machined to a desired shape for receiving the CMC layer either with or without an intermediate layer or bonding agent. Using the insulation material as at least a portion of the mold for forming the CMC layer can simplify the tooling requirements for the CMC layer and it eliminates the problem of tolerances of mating surfaces between the CMC and the insulation. Tolerance stack-up then occurs only on an inside surface of the CMC layer remote from the insulation. This surface is likely to be the least sensitive to tolerance stack-up in many applications. The two layers are cured/fired together to form an integral structure with a seamless interface. The surface of the insulation that is remote from the CMC layer (i.e. the hot gas washed surface) may be left in its as-formed condition or it may be machined to a final dimension after the composite layers are co-fired.

When fibers of the CMC layer are applied to the insulation layer mating surface and the matrix material is infiltrated around the fibers, or when wet CMC fibers are laid upon the mating surface, the matrix material will penetrate the pores of the insulating material layer. The extent of matrix penetration may be controlled by various surface treatments of the insulation. Intimate contact is achieved between the CMC and insulation layers as the CMC matrix material crosses the interface to form a continuous matrix across the interface, thereby strengthening the bond between the two layers. The two layers may be fired/cured together to form the integral composite structure. Curing and firing of the CMC layer is done at CMC processing temperatures and no extra bonding step is required. Post firing treatments may also be used to provide extra matrix infiltration or special heat treatments.

This process offers benefits when compared to the prior art process of joining together the pre-fired CMC and insulating layers. No mold or a simpler mold is required for fabricating the CMC layer since the insulating layer provides at least a part of this function. This means that there may be fewer processing steps and an associated reduction in processing cost. Since the CMC material is exposed to only one firing, there is less opportunity for material property degradation. Tolerance concerns are alleviated since the CMC layer conforms fully to the mating surface of the insulating layer as it is formed in its wet lay-up condition. The process further allows for complex shape fabrication not otherwise possible.

Figure 1B:
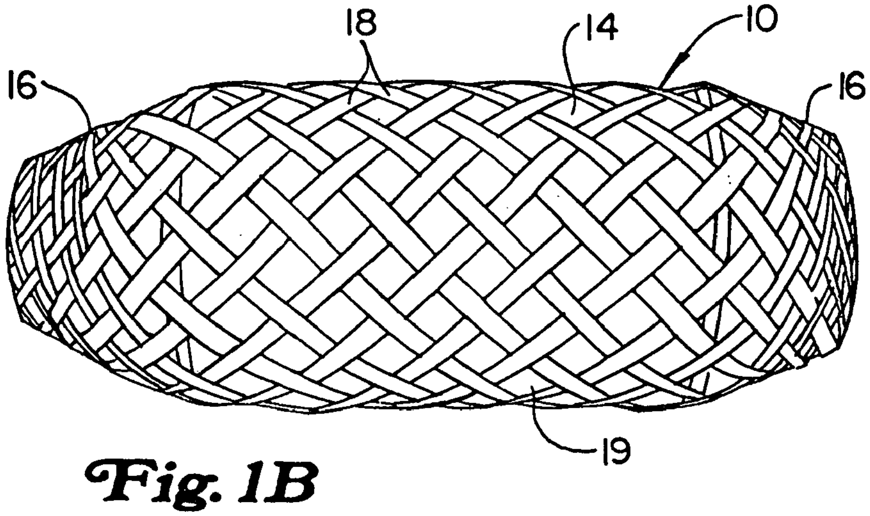
Figure 1C:
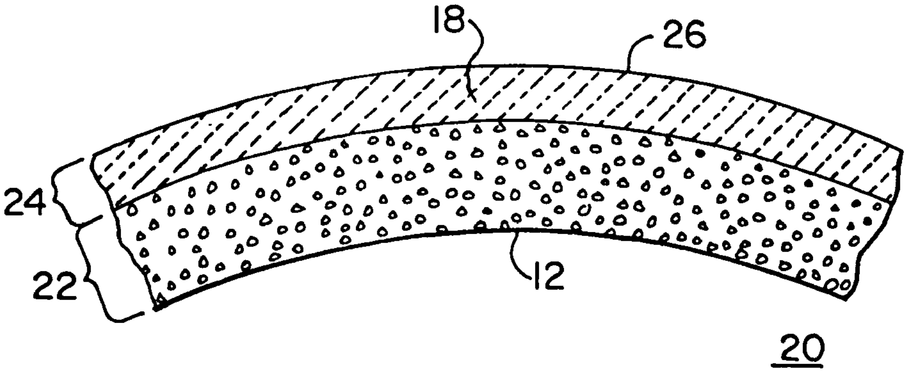

Examples are provided in the following paragraphs and in the Figures showing how the method of the present invention may be used to fabricate various components for a gas turbine engine. FIGS. 1A–1C illustrate one embodiment as applied to a cylindrical object such as a gas turbine combustor liner. FIG. 1A is a perspective view of a layer of thermally insulating material that has been cast in the shape of a cylinder 10. The cylinder 10 defines an inner surface 12 that will later be exposed to the hot combustion gasses in a gas turbine engine and an outer surface 14 that will function as a mating surface for the deposition of a structural CMC layer, as described more fully below. The cylinder 10 may be formed of any type of low thermal conductivity material known in the art, such as a fibrous insulation, a ceramic thermal barrier coating (TBC) material as may be used in other gas turbine applications, or the high temperature insulation described in U.S. Pat. No. 6,197,424, as examples. The terms thermally insulating material, layer of insulation, thermal insulation, insulation, insulating layer, etc. are used herein to include materials that are applied to a high temperature side of a CMC component in order to increase the allowable operating temperature of the component to beyond the upper temperature limit of the CMC material itself. The cylinder 10 may be used in subsequent steps in a dried green state (dried but unfired), in a bisque-fired state (fired at a temperature less than that needed to completely stabilize the insulation or less than the final firing temperature of the CMC) or in a fully stabilized state. The cylinder 10 may be formed or machined to desired interface dimensions 14 as required at this stage or in subsequent steps of the fabrication process.

The outside surface 14 of cylinder 10 serves as a mold for the subsequent deposition of a CMC layer when the cylinder 10 is mounted in a mandrel 16, as illustrated in FIG. 1B. The CMC layer may be formed by any process known in the art, for example by wet filament winding of a plurality of layers of ceramic fibers 18. A refractory bonding agent may be used to pre-butter the surface 14 of the cylinder before the addition of the fibers 18. FIG. 1B illustrates the composite component at a stage when only a portion of the layers of ceramic fibers 18 have been wound around the cylinder 10 and before the CMC layer is subjected to autoclave curing. The ceramic fibers 18 may be wound dry and followed by a matrix infiltration step, deposited as part of a wet prepreg lay-up, or deposited as a dry fabric (including greater than 2D fabrics) followed by matrix infiltration. Any of these methods may be used with an applied pressure to consolidate the CMC layer with processes and equipment known in the art. Fiber and matrix materials used for the CMC layer may be oxide or non-oxide ceramic materials, for example mullite, alumina, aluminosilicate, silicon carbide, or silicon nitride. The CMC material layer will fully conform to the dimensions of the outside mating surface 14 and the matrix material will at least partially infiltrate into pores in the cylinder of insulating material 10. FIG. 1C illustrates a cross-sectional view of a portion of the finished composite product 20 showing the seamless interface between the insulating layer 22 and the layer of CMC material 24 containing both ceramic reinforcing fibers 18 and the matrix material 26.

The insulating material cylinder 10 may be used in the CMC deposition step of FIG. 1B in the green state or in the bisque-fired step in order to more closely match the firing shrinkage of the insulating layer 22 and the CMC material layer 24 and/or to facilitate handling during subsequent CMC application. By performing the final firing of the insulating layer 22 and the CMC material layer 24 at the same time, the bond quality between the two layers will be improved by the sintering activity between the layers 22, 24. One may appreciate that the deposition of a CMC layer 24 over the outside surface 14 of cylinder 10 may present fewer difficulties than would the deposition of a layer of insulation on the inside surface of a CMC material cylinder, as had been done in the prior art. The composite product 20 is removed from the mandrel 16, trimmed and fired, and the inner surface 12 finished to a desired tolerance for use in a gas turbine application.

Figure 2:
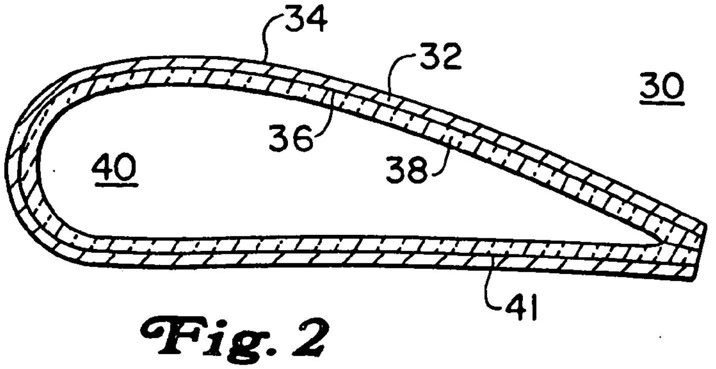
FIG. 2 is a composite vane for a gas turbine engine fabricated by a CMC-on-insulation fabrication method.

A composite stationary airfoil or vane 30 of a gas turbine engine, as illustrated in FIG. 2, may be fabricated with the present CMC-on-insulation construction method. A layer of thermally insulating material having an exterior airfoil shape such as airfoil section 32 is first fabricated from an insulating material such as the material described in U.S. Pat. No. 6,197,424. The outside surface 34 may be cast or machined to the desired airfoil configuration. The insulating airfoil member 32 has an inside surface 36 defining an interior volume 40. The inside surface 36 serves as a mold and mating surface for the subsequently formed structural CMC material layer 38. The CMC layer 38 may be applied via fabric lay-up, for example, and a pressure bladder (not shown) may be used in the interior volume 40 to apply pressure during the curing of the CMC layer 38. In this case it may be advantageous to have the insulating layer be thick or be supported by its casting tooling. A layer of a refractory bonding agent 41 or other appropriate adhesive may be applied to pre-butter the inside surface 36 before the CMC layer 38 is applied. A one-step curing process may be used to consolidate both the insulating layer 32 and the structural layer 38 to eliminate a separate bonding step and to provide a seamless joint between the two layers 32, 38.

Figure 3:
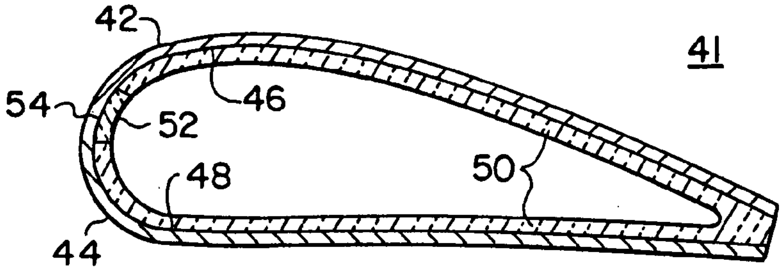
FIG. 3 is a composite vane for a gas turbine engine fabricated by a split airfoil CMC-on-insulation fabrication method.

A split airfoil construction may be used to simplify the lay-up of the CMC material on the inside of a composite vane 41, as illustrated in FIG. 3. Two mating airfoil member shell portions such as shell halves 42, 44 are formed of a thermally insulating material. The respective inside surfaces 46, 48 of the shell halves 42, 44 are fully accessible for lay-up of CMC material layer 50. The term “shell halves” is used herein to include portions that are not exactly one-half, but that are less than a full circumference around an interior volume so that the inside surface is accessible for the subsequent lay-up of the CMC layer. The shell portions 42,44 are cured to at least a bisque state to achieve a sufficient degree of structural strength for the molding of the CMC layer 50. The CMC material layer 50 may be laid-up directly onto the respective inside surfaces 46, 48 and then co-fired with the insulating material. The firing step may be performed on the two halves separately, with the halves being joined together after firing, or the two halves may be joined before final firing. A closure plate 52 may be formed of CMC material to span the joint 54 between the shell halves 42, 44.

In another embodiment, pre-cut sheets of CMC material 46, 48, 52 may be formed over a mandrel (not shown). The two insulating material shell halves 52, 54 are then closed around the CMC material and compressed to achieve the desired intimate contact between the CMC material and insulating material. A single length of CMC fabric (not shown) may extend completely around the mandrel, thereby eliminating the need for three separate sections 46, 48, 52 of the CMC material. In this embodiment, the mandrel and the shell halves 42, 44 are used together as a mold for shaping the CMC material layer 46, 48, 52 to the desired geometry.

Figure 4A:
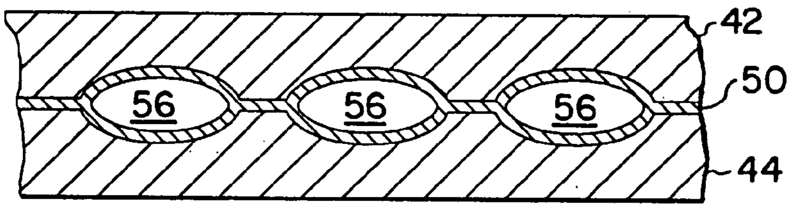
FIGS. 4A and 4B are trailing edge views of the composite vane of FIG. 3 illustrating alternative cooling passage construction options.
Figure 4B:
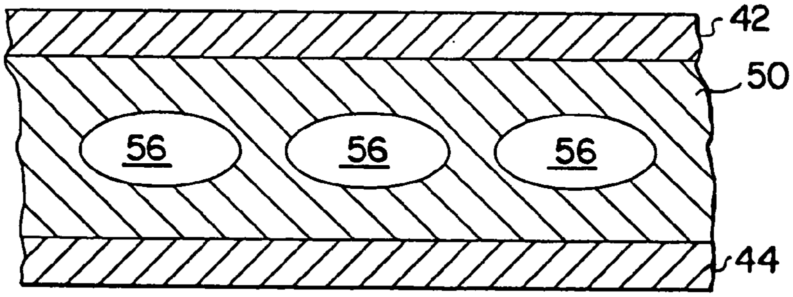

FIGS. 4A and 4B are two alternative end views of the trailing edge of vane 41 of FIG. 3. that show alternative constructions for cooling passage openings. A plurality of cooling passage openings 56 are formed between the trailing edges of the respective insulating material shell halves 42, 44. The openings 56 may be formed by inserting a fugitive material (not shown) in the location of the openings 56 during the lay-up of the CMC material layer 50, with the fugitive material being removed by evaporation during the firing stages or by a selective chemical process. Alternatively, a portion of the CMC material layer 50 may be selectively cut and removed to create openings 56. Cooling passages 56 may also be formed by a machining or drilling process.

Figure 5A:
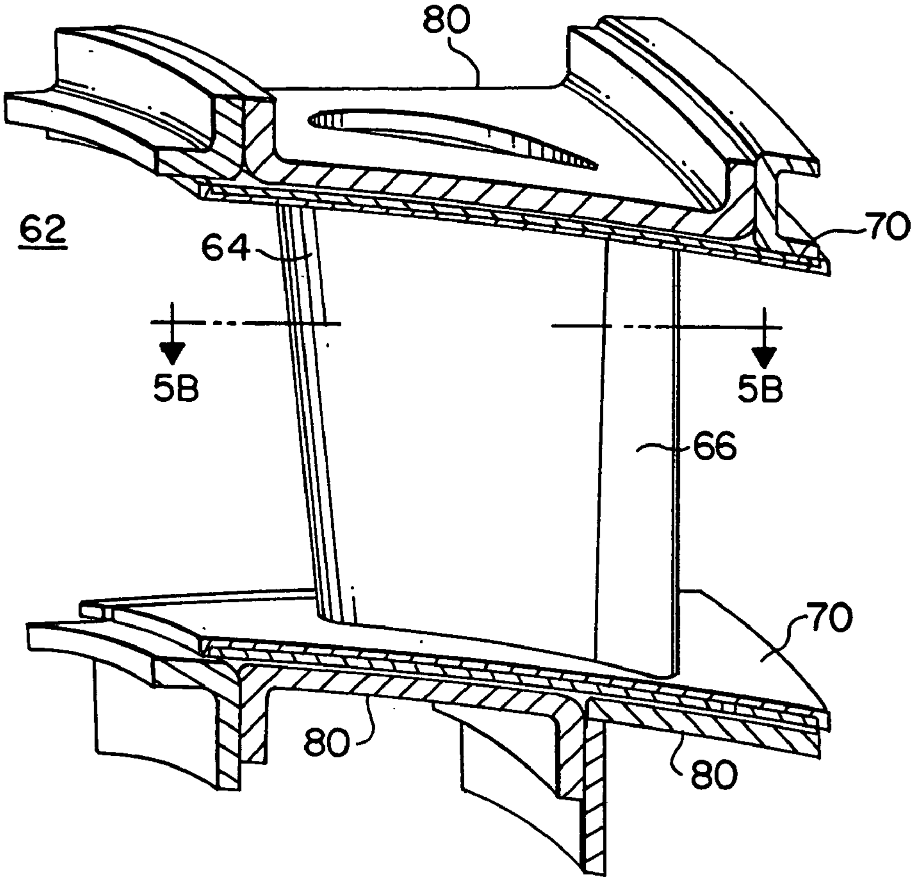
FIGS. 5A, 5B and 5C are perspective, cross-sectional and exploded views respectively of a gas turbine vane fabricated with a CMC-on-insulation process and having interlocking vane halves.
Figure 5B:
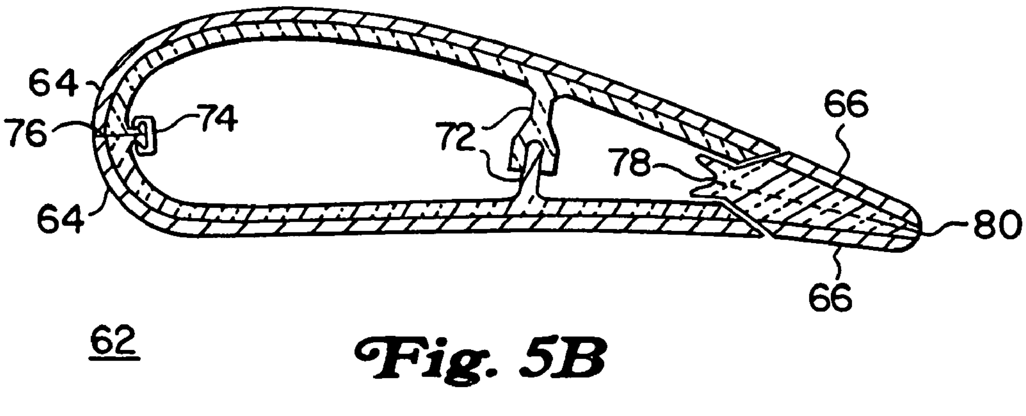
Figure 5C:
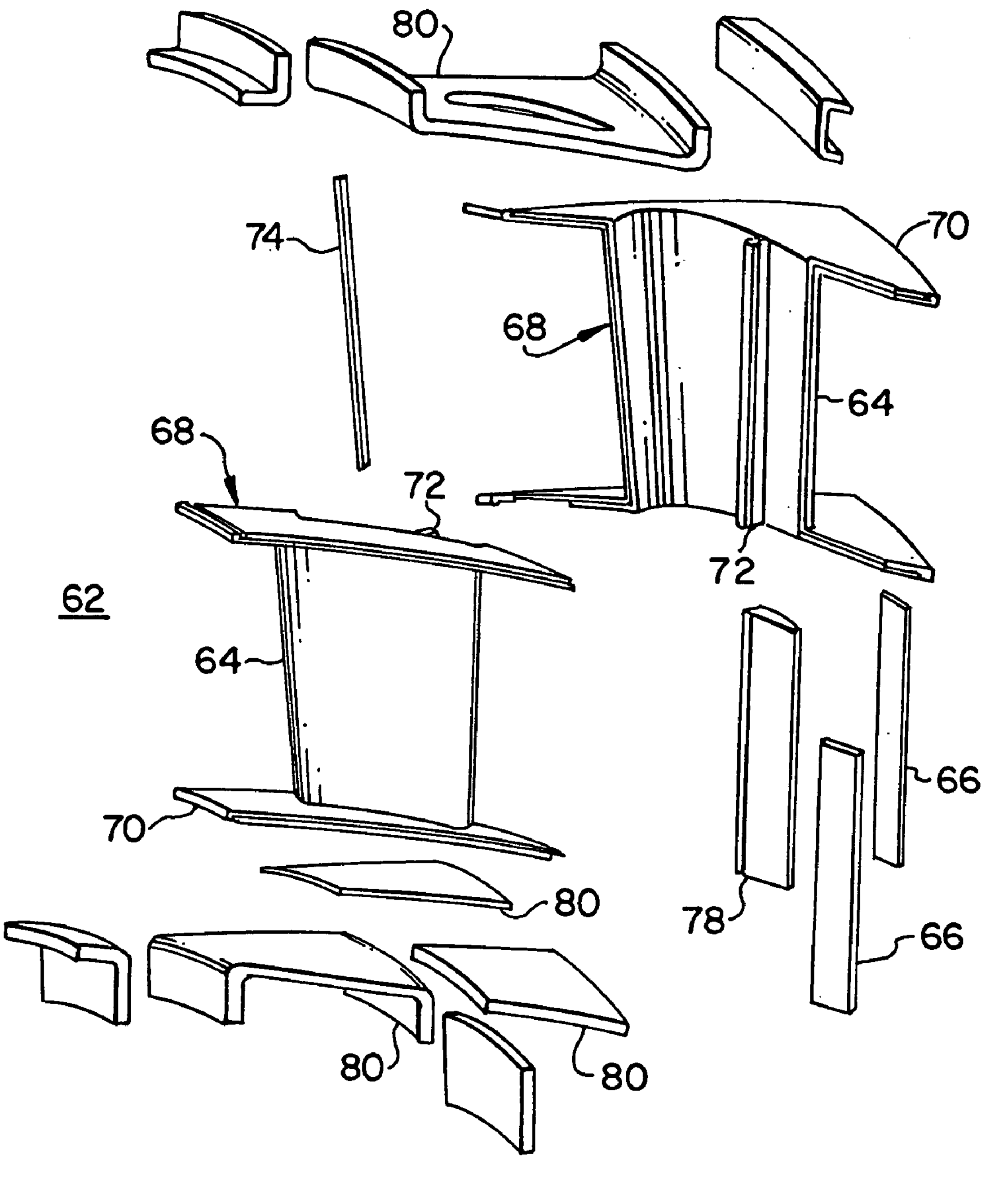

FIGS. 5A, 5B and 5C illustrate perspective, cross-sectional and exploded views respectively of a gas turbine vane fabricated with a CMC-on-insulation process and having interlocking vane halves. This embodiment provides access to the inside surface of the insulating airfoil members for convenient lay-up of the CMC structural material and it includes a dovetail locking arrangement between the vane halves to provide improved structural integrity and pressure sealing. Composite vane 62 includes mating ceramic insulating material airfoil members 64 and trailing edge ceramic insulating material members 66. The airfoil members 64 are used as a mold to form a layer of CMC material 68 inside each of the airfoil members 64. The insulating material airfoil members 64 and the layer of CMC material 68 extend to form platforms 70 on opposed sides of the airfoil section. The airfoil halves are then joined together and interlocked by one or more dovetail joints formed by mating locking members 72 formed integral with the layer of CMC material 68. A generally U-shaped locking member 74 is also formed of CMC material to form a locking joint between mating locking members 72 when the composite structure 62 is co-fired or adhesively bonded. The locking members 72, 74 provide an effective pressure seal across the leading edge joint 76 between the two insulating material airfoil members 64. A separate CMC trailing edge insert 78 may be formed to have a plurality of cooling passages 80 formed there through. CMC platform reinforcing members 80 span the CMC material layer halves 68.

Figure 6:
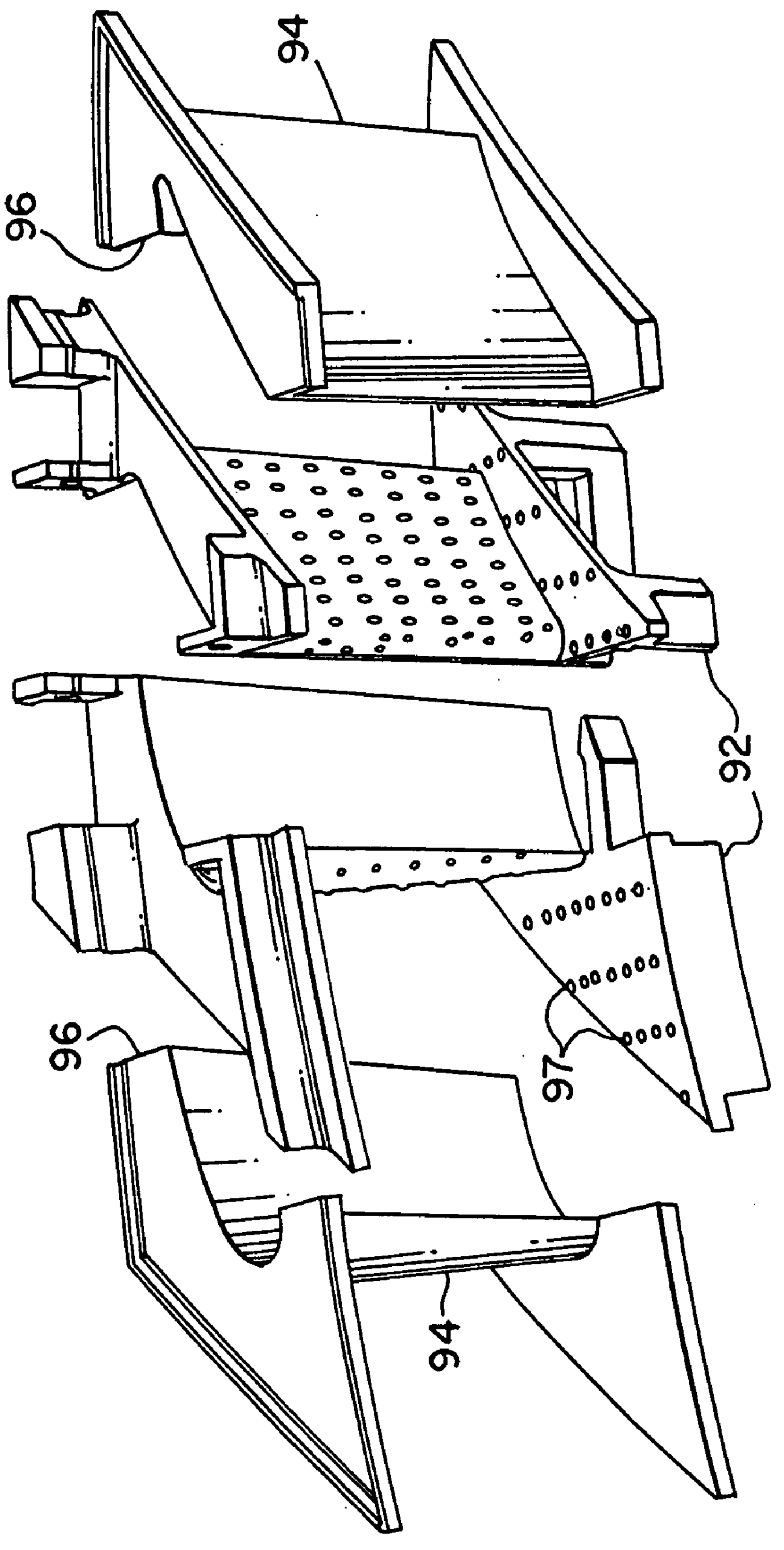
FIG. 6 is an exploded view of a gas turbine vane having a split metal core and fabricated with a CMC-on-insulation process.

FIG. 6 is an exploded view of a gas turbine vane 90 having a split metal core 92 and outer composite shells 94 fabricated with a CMC-on-insulation process. Opposed halves of a thermally insulating airfoil member 94 are first formed to function as respective molds for forming CMC structural layers 96. These materials may be co-fired to provide a seamless joint between the layers 94, 96. The insulation/CMC halves 94, 96 serve to shield the metal substructure 92 from the hot combustion gasses passing over the insulation airfoil member 94 during operation of a gas turbine engine using the vane 90. The metal substructure 92 provides structural support and directs the flow of cooling air against the CMC layer 96. The metal halves 92 interface with the CMC layer 96 with a sliding radial fit and along the tips of pin members 97 in order to allow relative movement between these two materials to accommodate differential thermal expansion. The metal halves 92 are joined by standard fasteners (not shown) that are also protected from the hot gas flow path by the insulation/CMC halves 94, 96.

Figure 7:
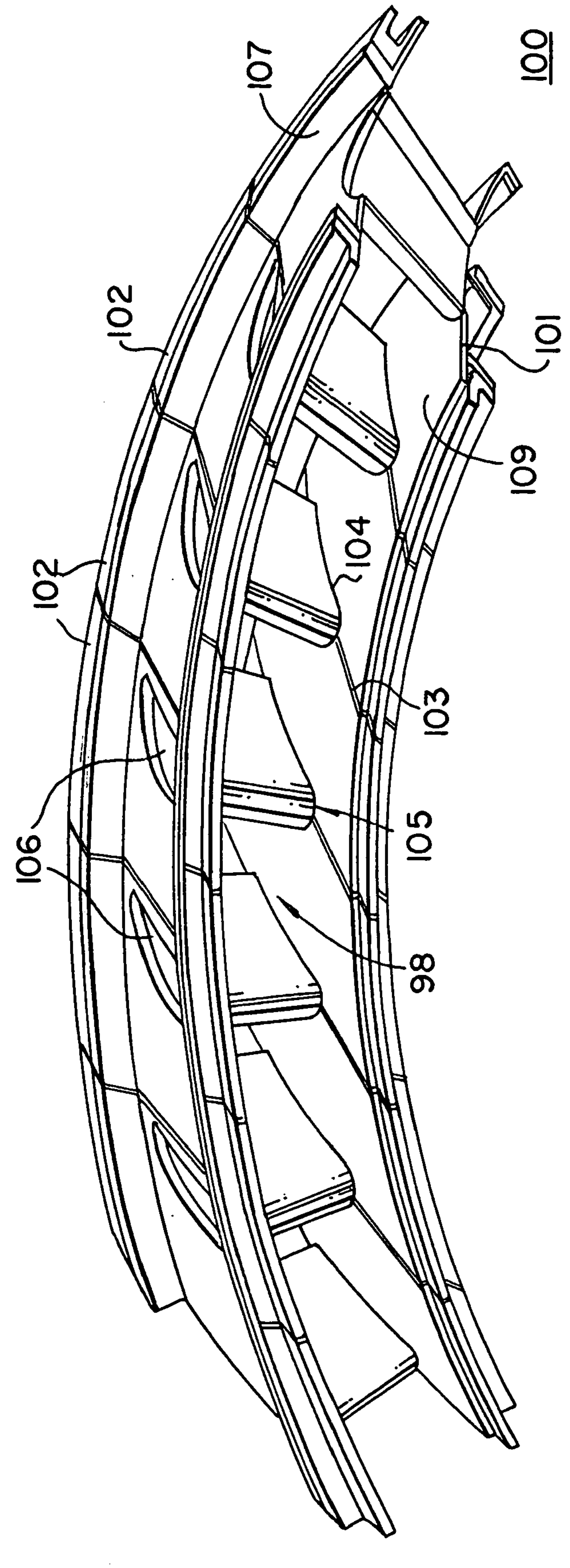
FIG. 7 is a perspective view of a plurality of paired vane halves joined together to form part of a vane ring of a gas turbine engine.

FIG. 7 is a perspective view of a plurality of paired vane halves that have been joined together to form part of a vane ring of a gas turbine engine. Typical vane construction locates the longitudinal joints between adjoining sections at locations between the respective vane airfoil members. The vane ring 100 of FIG. 7 utilizes a plurality of box structures 102, with each box structure 102 containing two opposed paired airfoil halves 104 joined at respective ends by opposed platform members 109 to define a passage 98 there between for the flow of hot combustion gas. The joints 103 between adjoining box structures 102 are formed at approximately the centerline of the assembled airfoils 105. The box structures 102 are formed by the CMC-on-insulation process described above wherein a layer of insulating material 101 is used as a mold for the lay-up of a layer of CMC material 107. The box structure 102 allows the lay-up of the CMC material 107 to be performed on an outside surface of the layer of insulating material 101. The layer of CMC material 107 may be cast and/or machined of any known ceramic insulating material. The insulating material layer 101 and the CMC material layer 107 laid thereon may be co-cured to form a seamless boundary between the layers. A solid core 106 may be used within each airfoil to accommodate hot gas leakage between the airfoil halves 104. The solid core 106 may be a ceramic or insulating material, for example, and it may be cast into its defining volume and co-cured with the other layers.

Figure 8:
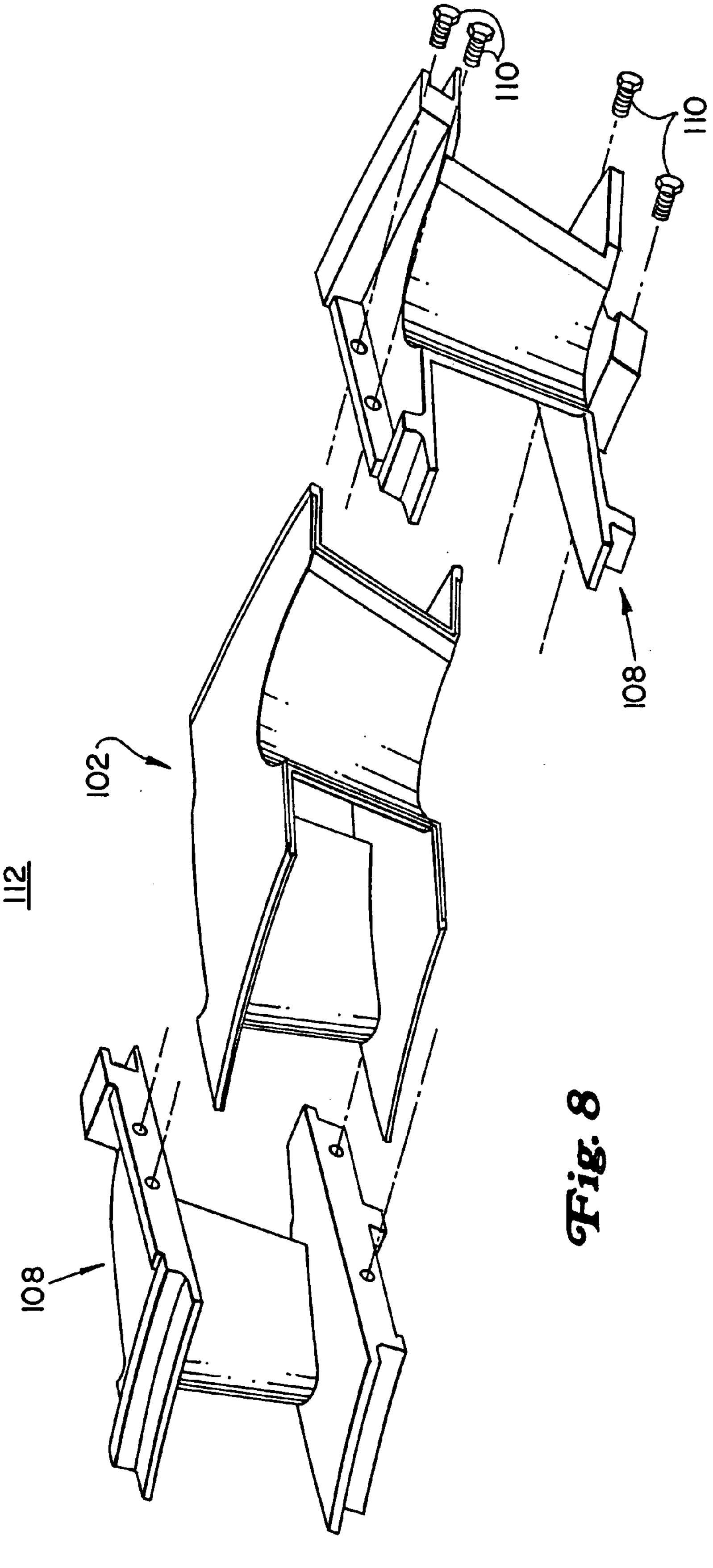
FIG. 8 is an exploded view of a box structure assembly having metal core halves trapping and supporting a CMC-on-insulation box structure.

The paired insulation/CMC vane half box structures concept may also be used with a metal core, as illustrated in FIG. 8. Two opposed cast metal vane halves 108 are joined together with fasteners 110 to trap and to support an insulation/CMC box structure 102 to form a box structure assembly 112. A number of such box structure assemblies 112 are then joined together to form a vane ring for a gas turbine engine.

The curing/firing steps used on the insulating material and the CMC material layers may be selected to control the shrinkage characteristics of the final composite structure. The insulating material may be partially or fully cured before the lay-up of the CMC material, or both layers may be cured from the green state together, depending upon the requirements of the particular application/geometry. In general, it may be useful to provide a compressive stress on the insulation layer. This can be accomplished in the embodiment of FIGS. 1A–1C by at least partially curing the cylinder 10 of insulating material layer 22 prior to the deposition of the CMC material layer 24. Upon final curing of the composite structure 20, a compressive hoop stress will be developed in the cylinder 10 due to the fact that the CMC material layer 24 will shrink more than the partially-preshrunk insulating material layer 22. In other embodiments it may be desired to minimize the shrinkage stress between the two layers, and the curing steps may be selected accordingly depending upon the expected shrinkage of the two layers. Control of the timing of the curing steps thus provides an additional degree of control over the fabrication process to achieve a desired result.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of manufacturing a composite structure, the method comprising;

forming a layer of porous thermally insulating material;

using the layer of porous thermally insulating material as a mold for receiving ceramic fibers and a matrix material in a wet state to form a layer of wet ceramic matrix composite material, and further comprising;

allowing the matrix material of the layer of wet ceramic matrix composite material to penetrate pores of the porous layer of thermally insulating material to form a continuous matrix across an interface between the respective layers; and curing the matrix material to form an integral composite structure.

2. The method of claim 1, further comprising only partially curing the layer of thermally insulating material prior to the step of using the layer of thermally insulating material as a mold to form the layer of ceramic matrix composite material.

3. The method of claim 1, further comprising curing the layer of thermally insulating material and the layer of ceramic matrix composite material simultaneously to form a bond there between.

4. The method of claim 1, further comprising:

partially curing the layer of thermally insulating material prior to the step of using the layer of thermally insulating material as a mold to form the layer of ceramic matrix composite material; and curing the layer of thermally insulating material and the layer of ceramic matrix composite material to a fully stabilized state simultaneously to form a bond there between.

5. The method of claim 1, further comprising:

forming the layer of thermally insulating material in the shape of a cylinder; and forming the layer of ceramic matrix composite material on an outside surface of the cylinder.

6. The method of claim 5, further comprising only partially curing the layer of thermally insulating material prior to the step of forming the layer of ceramic matrix composite material.

7. The method of claim 1, further comprising:

forming the layer of porous thermally insulating material in the shape of a cylinder; and wet filament winding reinforcing fibers of the layer of ceramic matrix composite material on an outside surface of the cylinder.

8. The method of claim 1, further comprising:

forming the layer of thermally insulating material to have an outside surface defining an airfoil shape and to have an inside surface; and forming the layer of ceramic matrix composite material on the inside surface.

9. The method of claim 1, further comprising:

forming the layer of thermally insulating material as a plurality of split airfoil shell portions, each shell portion comprising an accessible inside surface;

forming a respective layer of wet ceramic matrix composite material on the accessible inside surface of each of the split airfoil shell portions; and joining the split airfoil shell portions together to define a composite airfoil having the thermally insulating material as its outside layer and the ceramic matrix composite material as its inside layer.

10. The method of claim 9, further comprising curing the layer of thermally insulating material of each respective airfoil shell portion together with its respective layer of ceramic matrix composite material to form a bond there between.

11. The method of claim 9, further comprising:

forming mating locking members in the respective layers of ceramic matrix composite material; and joining the respective mating locking members together during the step of joining the airfoil shell portions together.

12. The method of claim 11, further comprising:

forming a generally U-shaped locking member of ceramic matrix composite material; and joining the respective mating locking members together with the generally U-shaped locking member.

13. The method of claim 9, wherein the step of joining the shell portions together further comprises:

attaching each shell portion and its respective layer of ceramic matrix composite material to a respective metal core member; and joining the respective metal core members together.

14. The method of claim 1, further comprising:

forming the layer of thermally insulating material to the shape of a box structure comprising a pair of opposed split airfoil portions joined at respective ends by an opposed pair of platform members and defining a hot combustion gas passage there between; and forming the layer of ceramic matrix composite material on an outside surface of the box structure.

15. A method of manufacturing a composite structure, the method comprising:

forming a layer of porous ceramic thermally insulating material;

applying a layer of wet ceramic matrix composite material to a surface of the layer of porous ceramic thermally insulating material so that the wet matrix material penetrates the pores of the insulating material to form a continuous matrix across an interface between the respective layers; and curing the matrix material to form to form an integral composite structure;

wherein an extent of matrix material penetration into the pores of the insulating material is controlled with a surface treatment of the insulating material.

* * * * *